US012460722B2

United States Patent
Van Raepenbusch et al.

(10) Patent No.: US 12,460,722 B2
(45) Date of Patent: Nov. 4, 2025

(54) REDUCTION ELECTRIFIED AXLE WITH INPUT PARKING BRAKE

(71) Applicant: DANA (WUXI) TECHNOLOGY CO., LTD., Jiangsu (CN)

(72) Inventors: Filip Van Raepenbusch, Bruges (BE); Yang Liu, Wuxi (CN); Chun Zhang, Wuxi (CN)

(73) Assignee: DANA (WUXI) TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/440,836

(22) Filed: Feb. 13, 2024

(65) Prior Publication Data

US 2024/0271699 A1    Aug. 15, 2024

(30) Foreign Application Priority Data

Feb. 14, 2023   (CN) .......................... 202320207485.6

(51) Int. Cl.
| | |
|---|---|
| *F16H 63/34* | (2006.01) |
| *B60K 1/00* | (2006.01) |
| *B60T 1/06* | (2006.01) |

(52) U.S. Cl.
CPC ....... *F16H 63/345* (2013.01); *F16H 63/3466* (2013.01); *B60K 2001/001* (2013.01); *B60T 1/062* (2013.01); *B60T 1/065* (2013.01)

(58) Field of Classification Search
CPC ............... F16H 63/345; F16H 63/3466; F16H 2200/0021; B60T 1/062; B60T 1/065; B60K 1/00; B60K 1/02; B60K 2001/001; H02K 7/006; H02K 7/116; B60L 15/007; B60L 15/2036
See application file for complete search history.

(56) References Cited

U.S. PATENT DOCUMENTS

| | | | |
|---|---|---|---|
| 8,826,764 B2 | 9/2014 | Hu | |
| 9,731,599 B2 | 8/2017 | Gagnon | |
| 10,717,352 B2 | 7/2020 | Hohenberg | |
| 11,428,302 B1* | 8/2022 | Bittlingmaier | B60K 17/34 |
| 11,840,205 B2* | 12/2023 | Fox | B60T 1/062 |
| 12,072,001 B2* | 8/2024 | Bittlingmaier | B60T 1/062 |
| 12,222,021 B2* | 2/2025 | Stadtfeld | F16H 1/145 |
| 2003/0158012 A1* | 8/2003 | Kwoka | F16H 48/22 |
| | | | 192/218 |
| 2020/0171940 A1* | 6/2020 | Ohlig | B60T 13/746 |
| 2024/0025389 A1* | 1/2024 | Zhang | B60T 8/17 |

FOREIGN PATENT DOCUMENTS

| | | | |
|---|---|---|---|
| DE | 102014225866 A1 | 6/2016 | |
| FR | 2726526 A1 * | 5/1996 | ............. B60T 1/065 |
| FR | 2905742 A3 | 3/2008 | |
| WO | 2014037199 A1 | 3/2014 | |

* cited by examiner

*Primary Examiner* — James J Taylor, II
(74) *Attorney, Agent, or Firm* — McCoy Russell LLP

(57) ABSTRACT

An electrified drivetrain may include a motor, a speed reduction gearbox driven by the motor, and a parking brake coupled to a low-speed portion of the speed reduction gearbox through a shaft that is parallel to a rotor of the motor.

20 Claims, 2 Drawing Sheets

REDUCTION ELECTRIFIED AXLE WITH INPUT PARKING BRAKE

CROSS-REFERENCE TO RELATED APPLICATION

The present application claims priority to Chinese Utility Model application Ser. No. 20/2320207485.6, entitled "REDUCTION ELECTRIFIED AXLE WITH INPUT PARKING BRAKE", and filed Feb. 14, 2023. The entire contents of the above-listed application is hereby incorporated by reference for all purposes.

TECHNICAL FIELD

The field relates to electrified vehicle drivetrains.

BACKGROUND AND SUMMARY

A vehicle may include an electrified drivetrain with an electric machine, such as an electric motor, drivingly coupled therein, wherein the drivetrain includes transmission gears and a driveline. The electric machine may act as a prime mover or a secondary mover, such as in an electric vehicle (EV) or a hybrid vehicle, respectively. The drivetrain may include reduction ratios to provide a desired gear ratio for rotational energy transfer between the electric machine and the wheels. A gearbox may be used to house the reduction ratios to increase the torque or provide the desired gear ratio. The driveline may incorporate a parking brake, such as an emergency brake, that may be engaged by a user.

In order to provide an electric motor for the drivetrain, the frame of the driveline and/or the attachment points to the driveline may be altered. Additionally, the installation of the brake into the driveline may use a specialized electric machine with a through axle, such as a through axle motor. The through axle motor may be drivingly coupled to an axle through extensive modifications and including additional attachment points. Likewise, components of a parking brake may be incorporated into the axle and drivingly coupled via additional attachment points. This may result in substantial alterations to an axle or other components of a driveline for electrification. These factors may substantially increase the material requirements as well as complicate the assembly and maintenance of an electrified driveline.

If the parking brake were to be drivingly coupled directly to the output of the motor or between the motor and reduction sets, the axle may have fewer attachment points and other modifications. However, the electric machine may still be a specialized configuration with a through axle. Additionally, such a configuration may subject the parking brake to high speeds of rotation. In some examples, the high rotational speeds placed on the parking brake may result in increased drag losses and decreased performance. As a further concern, the high rotational speeds may reduce the lifespan of the parking brake and increase the frequency of maintenance. Additionally, there may be increased difficulty maintaining and disassembling a parking brake for either example of electrification.

The inventors herein have recognized these and other issues with such systems. In one example, the inventors have developed an assembly that incorporates a brake component and a reduction component. The assembly allows an electric motor and a park brake to be drivingly coupled in parallel to the driveline. An electric machine may be drivingly coupled to the reduction component via an output, which may be a single output. The brake component may be drivingly coupled to a shaft. The shaft may be drivingly coupled to the low-speed section formed on the drivetrain after the reduction component of the assembly. The gear reduction may include a triple gear reduction in an example. In this way, it is possible to provide electrification with fewer modifications to the driveline and further enable parking brake operation with improved packaging.

In another example, an electrified drivetrain may comprise a motor, a speed reduction gearbox driven by the motor; and a parking brake coupled to a low-speed portion of the speed reduction gearbox through a shaft that is parallel to a rotor of the motor.

In some examples, drivingly coupling the brake component and reduction components such that the outputs thereof are arranged as parallel inputs to the speed reduction may allow for use of the axle and driveline without altering the frame and/or increasing additional attachment points to the driveline. The brake component and electric machine may be external to the driveline. Such an arrangement may reduce the time and complexity to assemble and maintain the brake, the motor, and other components of the electrified driveline. Extra attachment points may be reduced or eliminated for the axle, allowing for the assembly to be modular with a plurality of axles and drivelines. The coupling of the electric machine and parking brake in parallel, with respect to the shafts and the axis of a driveline, may allow for a standard electric machine or other source to be used in place of a through drive motor. Additionally, the disclosed configuration may allow for the electric machine to be more compact and operate at a greater rotational speed. Attaching the parking brake component external to the driveline may also allow a brake to be used without being incorporated with a through drive motor. Drivingly coupling the brake component to the low speed portion section of the reduction component may reduce the losses of energy due to drag, allowing a disk brake to be used. Additionally, the brake may be activated by a single or plurality of mechanically or hydraulically actuated calipers, or a single or plurality of spring applied hydraulic released brake (SAHR) calipers.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The description relates to a drivetrain that may incorporate a brake component and a reduction component. The assembly may be drivingly coupled to an axle and a driveline of a vehicle. The assembly may be external to the components of the driveline and axle. The assembly may electrify the drivetrain by incorporating an electric machine. The assembly may be modular, able to be drivingly coupled to while eliminating or minimizing additional attachment points or other modifications a plurality of axles and drivelines. The electric machine may act as an electric motor and be drivingly coupled to the reduction component of the assembly. The reduction component, such as a gearbox, may incorporate a plurality of gears or other reducers to reduce the rotational speed, rotations per minute (RPM), of the output of the electric machine. The brake component may incorporate a brake coupled to a shaft, wherein the brake may act as a parking brake. The shaft may be coupled to the output of the reduction component and may be positioned parallel with respect to the electric machine and the output of the electric machine. The output of the reduction component may rotate at a lower speed than the motor, allowing for a standard park brake, such as a dry disk brake, to be used to stop or prevent the rotation of the shaft. The lifespan of the brake may be increased and the drag losses may be limited due to the slower rotation of the shaft. Additionally, the brake may be activated via a single or plurality of mechanically or hydraulically actuated calipers, or a single or plurality of spring applied hydraulic released brake (SAHR) calipers.

Figure 2:
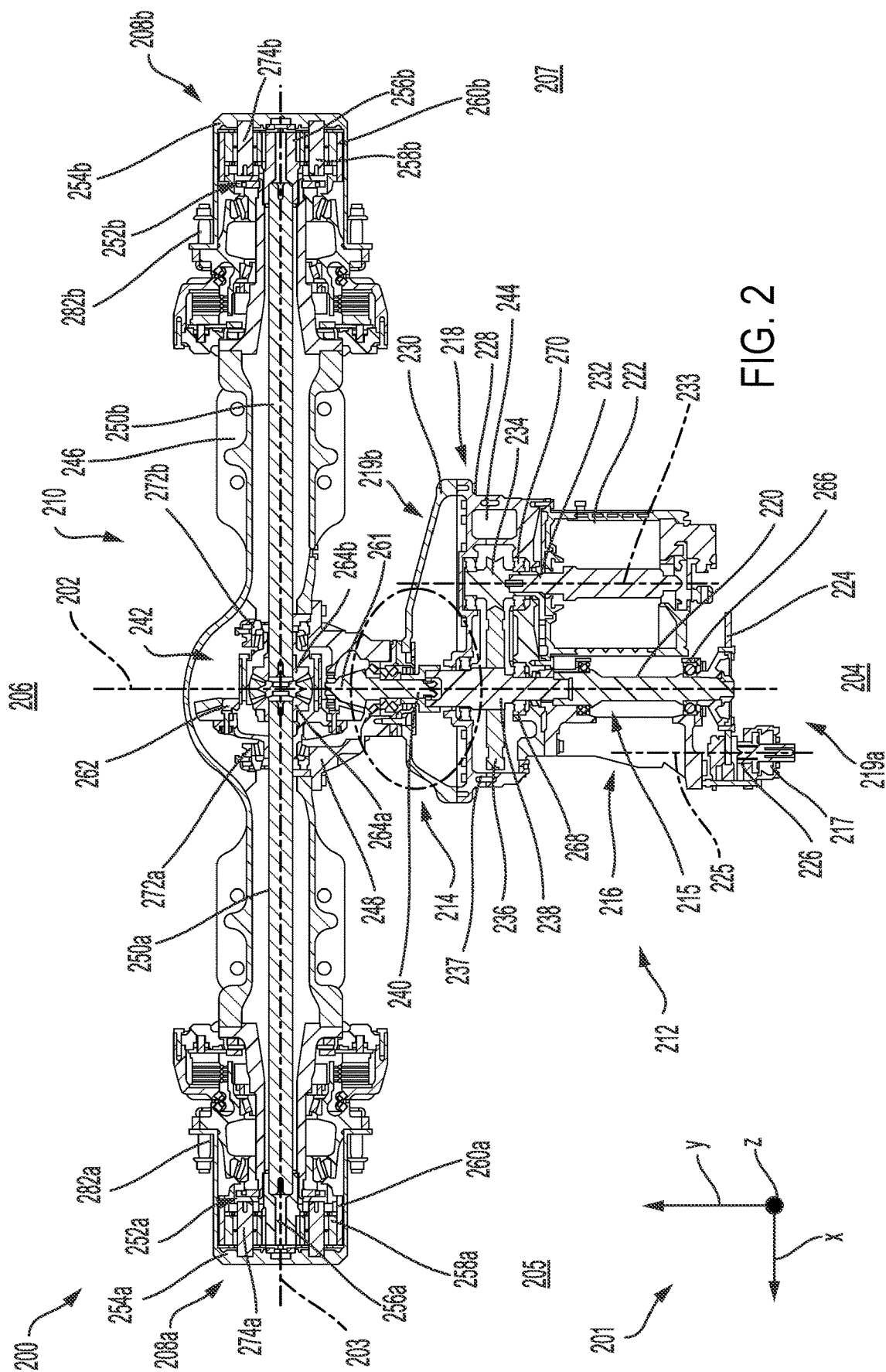
FIG. 2 shows a first section view from a top perspective of the assembly drivingly coupled to an axle.

A schematic of a vehicle is shown with a transmission and driveline powered by an electric motor. FIG. 2 shows a sectional view of the transmission and driveline including a differential and axle from a top perspective. The system includes a brake component and a gear reduction component in FIG. 2.

Figure 1:
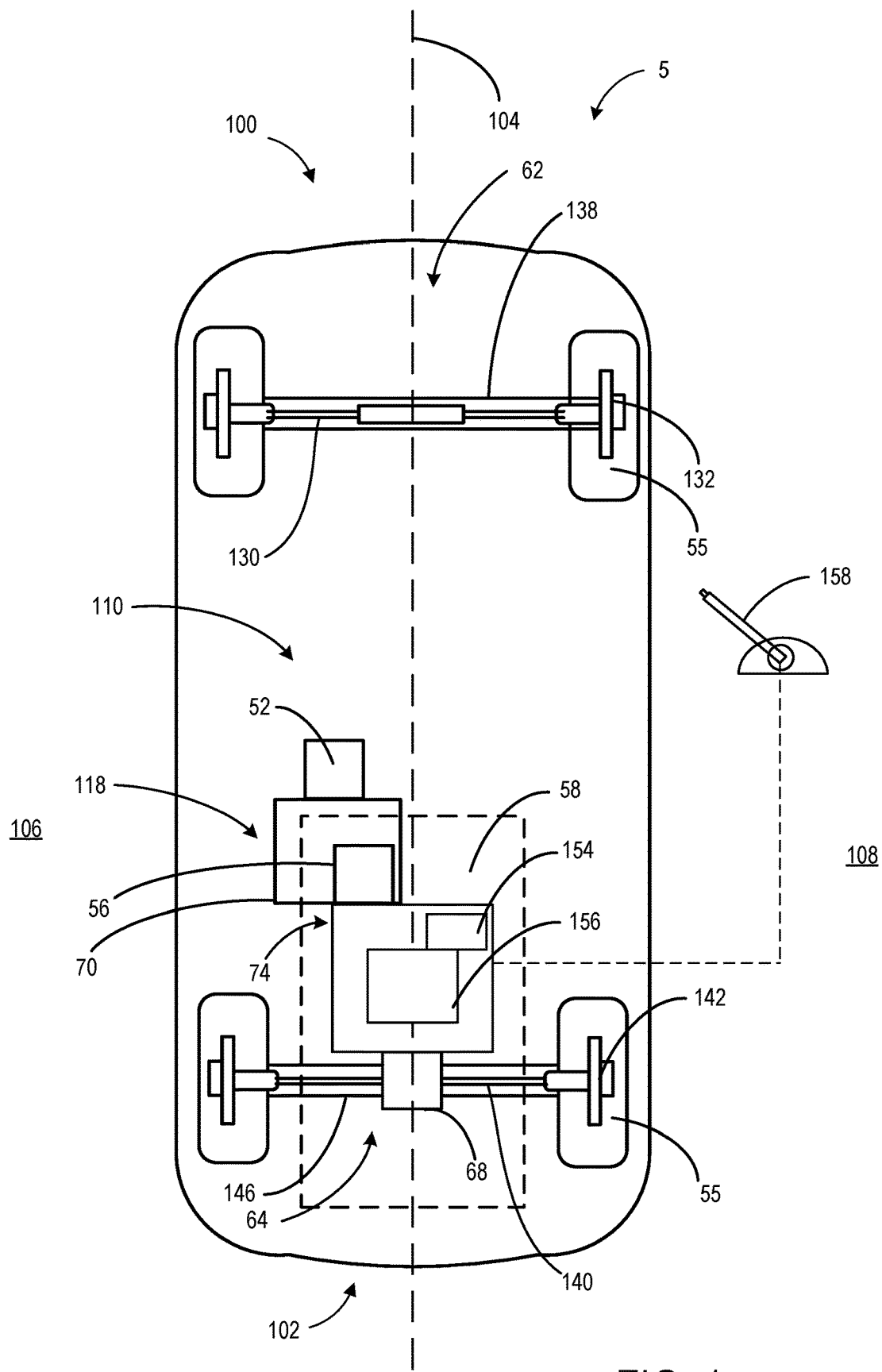
FIG. 1 shows an example schematic of a vehicle which may include assembly of the present disclosure.

It is also to be understood that the specific assemblies and systems illustrated in the attached drawings and described in the following specification are exemplary embodiments of the inventive concepts defined herein. For purposes of discussion, the drawings are described collectively. Thus, like elements may be commonly referred to herein with like reference numerals and may not be re-introduced. FIG. 1 shows a schematic of example configurations with a relative positioning of the various components. Herein, when the vehicle is positioned on level ground, vertical is with respect to gravity. FIG. 2 is shown approximately to scale, although other relative dimensions may be used. As used herein, the terms "approximately" is construed to mean plus or minus five percent of the range unless otherwise specified.

Further, FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above the other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with a longitudinal axis unless otherwise specified. Features described as counter-axial may be approximately perpendicular to the longitudinal axis unless otherwise specified. Features described as radial may circumferentially surround or extend outward from an axis unless otherwise specified.

Features described as longitudinal may be approximately parallel with an axis that is longitudinal with respect to forward and reverse travel of the vehicle. Lateral may be perpendicular to longitudinal and refer to directions to the left and right with respect to the vehicle's front.

Turning to FIG. 1, an example vehicle 5 is shown. The vehicle 5 may have a front end 100 and a rear end 102, and may be bisected into two approximately symmetrical halves by a longitudinal axis 104. The longitudinal axis 104 may divide the figure into a first side 106 and a second side 108.

In some examples, vehicle 5 may be a hybrid vehicle with multiple sources of torque available to one or more vehicle wheels 55. In other examples, vehicle 5 may be an all-electric vehicle, powered exclusively by an energy storage device such as a battery 58.

In the example shown, vehicle 5 includes a mover 52. For one example, the mover 52 may be a prime mover. For another example, the mover 52 may be a secondary or tertiary mover.

In some examples, the mover 52 may be an electric machine such as an electric motor, an electric motor/generator, or an electric motor/engine. The mover 52 may receive electrical power from the battery 58, which is converted to rotational energy, e.g., torque, at a transmission 56. The torque may be delivered to vehicle wheels 55, which includes a set of front wheels proximate to the front end 100 of vehicle 5 and a set of rear wheels proximate to the rear end 102 of vehicle 5. Mover 52 may also be operated as a generator to provide electrical power to charge the battery 58, for example, during a braking operation.

Mover 52 provides rotational energy to the wheels 55 of vehicle 5 via the transmission 56. The wheels 55 may be drivingly coupled to the vehicle 5 and/or transmission 56 via a first axle 62 and a second axle 64. Vehicle 5 has the first axle 62 proximate to the front end 100 and the second axle 64 proximate to the rear end 102 of vehicle 5. For this example, the embodiment of vehicle 5 has the mover 52 and the transmission 56 closest to the rear end 102 of vehicle 5. A gearbox 70 is incorporated into the transmission providing the transmission with different gears to select via a clutch. For this example, the mover 52 and transmission 56 may provide rotational energy to an assembly 74 via an output to transfer rotational energy to a differential 68 to rotate the wheels 55 closest to the rear end 102.

The mover 52, components of the second axle 64, the transmission 56, the differential 68, and assembly 74 may comprise portions of a powertrain 110. The components of the second axle 64, the transmission 56, the differential 68, and assembly 74 may comprise portions of a drivetrain 118. The drivetrain 118 may act as the drivetrain of the vehicle 5.

It will be appreciated that in other examples, rotational energy may be alternatively provided to the wheels 55 located near the front end 100 of vehicle 5. Furthermore, in other examples, each of the wheels 55 near the front end 100 and the wheels 55 near the rear end 102 may be coupled to individual transmissions, such as when vehicle 5 is configured with all-wheel drive. As well, in other embodiments, transmission 56 and/or mover 52 may be arranged closer to the rear end 102 of vehicle 5 rather than the front end 100.

It will be appreciated that in other examples of embodiments of mover 52 may not provide rotational energy to assembly 74 via the transmission 56. For example, the mover 52 may be drivingly coupled directly to assembly 74. The assembly 74 may then transfer rotational energy to the differential 68 to rotate the wheels 55. For this example, the mover 52 may not be a prime mover.

It will be appreciated that there may be other inputs drivingly coupled to the assembly, such as a driveshaft.

For one example, the assembly 74 may be located proximate to the rear end 102. The assembly 74 may be drivingly coupled to the second axle 64 and the differential 68. The assembly 74 may lock the wheels 55 proximate to the rear end 102 by locking and preventing the rotation of a shaft 140.

It is to be appreciated, that the location of assembly 74 relative to an end of a vehicle may be non-limiting. It is also to be appreciated, that the coupling of assembly 74 relative to an axle of a vehicle may be non-limiting. For an example of another embodiment, the vehicle 5 may have the assembly 74 located proximate to the front end 100. For this example, the assembly 74 may be drivingly coupled to the first axle 62 via a differential. The assembly 74 may lock the wheels 55 proximate to the front end 100 by locking and preventing the rotation of a shaft 130.

The battery 58 may be between the vehicle wheels 55 and closer to the rear end 102 of vehicle 5 than the front end 100. For example, the battery 58 may be positioned below rear passenger seats of the vehicle. In another example, the battery 58 may be located in a floor of a rear compartment of the vehicle or may be integrated into a vehicle chassis. In other examples, however, the battery 58 may be located in a different relative position within vehicle 5 than shown in FIG. 1.

The wheels 55 proximate to the front end 100 may be drivingly coupled to axle 62 via a shaft 130. The wheels 55 proximate to the front end 100 may be fastened to hubs 132 that may be drivingly coupled to a shaft 130. The shaft 130 may be enclosed by an axle housing 138.

Likewise, the wheels 55 proximate to the rear end 102 may be drivingly coupled to axle 64 via a shaft 140. The wheels 55 proximate to the rear end 102 may be fastened to hubs 132 that may be drivingly coupled to a shaft 140. The shaft 140 may be enclosed by an axle housing 146.

The assembly 74 may comprise a brake component 154 and a reduction component 156, such as a gearbox. The reduction component 156 may incorporate a reduction set. The reduction set may slow the rotation speed of an input to the reduction component 156. The output of the mover 52 and/or the output of the transmission 56 may be drivingly coupled and act as an input to the reduction component 156. The brake component 154 may have a brake, such as a parking brake. The brake of the brake component 154 may be bracingly couple to the output of the reduction component 156, such that the rotation of the output of the reduction component 156 may be slowed, stopped, or prevented. The brake of the brake component 154 may lock the output of the reduction component 156. The output of the reduction component 156 may be an input into the differential 68. For one example, the brake component 154 may be closest to the second side 108 and the reduction component 156 may be closest to the first side 106. However, it is to be appreciated that the location of the brake component 154 and reduction component 156 may be positioned differently. For another example, the brake component 154 may be closest to the first side 106 and the reduction component 156 may be closest to the second side 108.

The brake component 154 of the assembly 74 may be engaged via an input device 158. The input device 158 may be a manually engaged device, such as a lever or a pedal. When the input device 158 is engaged to lock the brake component 154, the brake component 154 may be locked via a plurality of methods, such as via mechanical or pneumatic force, or an electronic signal.

A set of reference axes 201 are provided in FIG. 2. The reference axes 201 indicate a y-axis, an x-axis, and a z-axis. In one example, the z-axis may be parallel with a direction of gravity and the x-y plane may be parallel with a horizontal plane that axle 210 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

Turning to FIG. 2, a sectional view 200 shows the internal components and housing of an axle 210 and a brake assembly 212 that may be part of a vehicle, such as vehicle 5. Sectional view 200 may be taken from a top perspective of the axle 210 and brake assembly 212, for this example in a positive direction of the z-axis. A first axis 202 may divide the axle 210 and brake assembly 212 into two halves. There may be a first side 204 and a second side 206 on opposite sides relative to the axle 210 and the brake assembly 212, wherein the first side 204 is closer to the brake assembly 212 and second side 206 is closer to axle 210. There may be a third side 205 and a fourth side 207 divided by the axis 202. On the third side 205 of the axis 202 may be a first hub 208a. On the fourth side 207 of axis 202 may be a second hub 208b. A second axis 203 may be normal to the first axis 202. The axle 210 may be centered on the second axis 203. The first axis 202 may be a centerline and may represent a longitudinal axis of a vehicle. In an example, the first axis 202 may be parallel with a central longitudinal axis of the vehicle but laterally offset therefrom. Likewise, the second axis 203 may represent a lateral axis of a vehicle. In an example, the second axis 203 may be parallel with a central lateral axis of the vehicle but laterally offset therefrom.

The brake assembly 212 may be the assembly 74 with reference to FIG. 1. Axle 210 may be drivingly coupled to brake assembly 212 via an input section 214. The axle 210 may be part of an electrified drivetrain. Axle 210 may be axle 64 for examples where the mover 52 and assembly 74 are proximate to the rear end 102 and drivingly couple to axle 64 with reference to FIG. 1. For these examples, the first hub 208a and second hub 208b may be hubs 142.

Axle 210 may also be axle 62 for examples where mover 52 and assembly 74 are proximate to the front end 100 and drivingly coupled to axle 62 with reference to FIG. 1. For these examples, the first hub 208a and second hub 208b may be hubs 132.

The brake assembly 212 may be formed of a brake component 216 including a motor 217 driving the brake component 216. The brake component 216 may be mechanically fixed to a housing of a reduction component 218, and further configured to brake a shaft rotationally coupled with one or more gears of the reduction component 218. The brake component 216 may act as a parking brake that provides a parking brake operation. The motor 217 may be drivingly coupled to and act as a brake motor for the brake component 216. The brake component 216 and reduction component 218 may be drivingly coupled to one another via a driveshaft 215. Driveshaft 215 may be centered on axis 202, and may act as longitudinally positioned driveshaft. Driveshaft 215 may be formed of a plurality of shafts coupled together such that may spin and rotate as a single shaft.

For an example, the motor 217 may be mechanically fixed to the brake component 216. An electric machine 222 may be drivingly coupled to the reduction component 218 and electrify the axle 210 and the drivetrain to propel the vehicle. The electric machine 222 may act as a traction motor. The reduction component 218 may drivingly couple the electric machine 222 to the axle 210 via the input section 214. The brake component 216 may be brake component 154 with reference to FIG. 1. The reduction component 218 may be reduction component 156 with reference to FIG. 1. The reduction component 218 may incorporate and/or act as a speed reduction gearbox for the electric machine 222.

The driveshaft 215 may extend through and be a part of the input section 214. The reduction component 218 may span laterally across the driveshaft 215. The brake component 216 may be located on the opposite side of the axis 202 from the electric machine 222. For example, the brake component 216 may be nearest to the third side 205, and the electric machine 222 may be nearest to the fourth side 207. The brake component 216 and electric machine 222 may be located on one side, and the axle 210 may be located on the other side of the assembly 212. For example, the brake component 216 and electric machine 222 may be nearest to the first side 204 and the axle 210 may be nearest to the second side 206.

The assembly 212 may have a first side 219a and a second side 219b. The first side 219a and second side 219b may be opposite to each other and located on opposite ends of the reduction component 218. The electric machine 222 and brake component 216 may extend from and be coupled to the first side 219a. The electric machine 222 and brake component 216 may extend in a longitudinal direction with respect to the axis 202. The second side 219b may be positioned closest to the input section 214.

The brake component 216 may brakingly couple to a first shaft 220, wherein the components of the brake may slow, stop, or prevent the rotation of first shaft 220. The first shaft 220 may act as an output shaft that the brake component 216 may be couplable and decouplable from. The brake component 216 incorporates a brake surface. The brake surface may be disk 224. Disk 224 may be a dry disk brake. Disk 224 may slow, stop, or prevent the rotation of first shaft 220 when drivingly coupled to the first shaft 220 and the brake component 216 is engaged. A caliper 226 may be actuated to engage or disengage with the disk 224 and first shaft 220. When engaged the caliper 226 may drivingly couple and lock with the disk 224. The caliper 226 may have a single or a plurality of brake pads. When the caliper 226 is engaged, the brake pads may abut, make surface sharing contact with, and apply a frictional force to the disk 224. The caliper 226 may be driven by the motor 217. The motor 217 may actuate the caliper 226 such that the caliper 226 may engage with the disk 224. When drivingly coupled with first shaft 220 and the caliper 226 is engaged, the disk 224 may slow the speed of rotation, stop, or prevent the first shaft 220 from rotating.

The caliper 226 may be a mechanically or hydraulically actuated caliper, or a SAHR caliper. In one example, the motor 217 may be an electric motor. However, for other examples, the motor 217 may be another type of motor such as a hydraulic motor. Motor 217 may be centered about an axis 225. Axis 225 may act as a rotational axis for motor 217 and be parallel with the first axis 202. The motor 217 may translate the caliper 226 axially, with respect to the axis 202, in a first direction or a second direction as part of a method of operating the brake component 216. When translated in a first direction, for example such that the caliper 226 is closer to the second side 219b, the caliper 226 may couple and engage with the disk 224. When translated in a second direction, for example such that caliper 226 is further from the second side 219b, the caliper 226 may uncouple and disengage from the disk 224. First shaft 220 may drivingly couple to a reducer, such as a gear, of the reduction component 218. There may be a plurality of calipers 226.

A housing 228 and a flange 230 may enclose the reduction component 218. The flange 230 may be coupled or be fastened to the housing 228 and enclose portions of the input section 214. The reduction component 218 may comprise a plurality of reducers, such as gears. The reducers form ratios that may reduce the speed of rotation and increase the torque of rotational energy passed through. The reduction component 218 may have at least two reducers arranged in parallel. The first reducer may be a part of and coupled to high-speed portion of the reduction component. The last reducer may be part of and coupled to the low-speed portion of the reduction component. The reducers of reduction component 218 may be gears, such as a first gear 234 and a second gear 236. For one example, the first gear 234 may act as the first reducer of the reduction component. The second gear 236 may act as the last reducer of the reduction component.

The electric machine 222 may have an output 232 that may be drivingly coupled to the first gear 234. The output 232 may be drivingly coupled to or formed from the rotor of the electric machine 222. The electric machine 222 may be approximately centered on a motor axis 233, such that the output 232 and rotor are approximately centered about the motor axis 233. The motor axis 233 may be parallel with the first axis 202 and axis 225. The drivetrain may be electrified by the electric machine 222 via the driving coupling of the output 232 and first gear 234. The output 232 may therein act as an input for the reduction component 218 and a speed reduction gearbox input.

The first gear 234 may be drivingly coupled to the second gear 236 via a plurality of teeth. The first gear 234 may be driven by the output 232, and the second gear 236 may be driven by the first gear 234. The first and second gears 234, 236 may be housed in a chamber 237 formed of the housing 228. The housing 228 may have a plurality of chambers of different dimensions. The second gear 236 may be drivingly coupled to a second shaft 238. The second gear 236 and second shaft 238 may form the low-speed portion of the reduction component 218.

The first shaft 220, the second shaft 238, and an output 240 may form the driveshaft 215, acting collectively as a longitudinally positioned driveshaft. The second shaft 238 may be directly drivingly coupled to the first shaft 220. Second shaft 238 may also be directly coupled to an output shaft 240 of the reduction component 218, which output shaft 240 is directly coupled to the input of a differential 242. The output 240 may extend from the second side 219b. The first shaft 220, second shaft 238, and output 240 may be aligned when coupled, such that the driveshaft 215 may be approximately centered about the first axis 202. The driveshaft 215 may be arranged approximately parallel with respect to the output 232 and electric machine 222.

The output 240 may act as an output shaft for the reduction component 218, such as a speed reduction gearbox output. The output 240 may act as an input, such as an input shaft, for the input section 214. The output 240 may act as an input, such as a differential input, that drivingly couples to the differential 242 of the axle 210. Differential 242 may act as an axle differential for axle 210.

The driveshaft 215 may spin about the first axis 202, such as when a torque is transferred to the second shaft 238 from the electric machine 222 via the first and second gears 234, 236. When the friction from the disk 224 drivingly coupled to the first shaft 220 is greater than the torque of the second gear 236, the rotation of the driveshaft 215 may be slowed, stopped, or prevented.

Additionally, it is to be appreciated that an input or another shaft may be drivingly coupled to the first shaft 220, such as another driveshaft different from driveshaft 215.

Chamber 237 and the other chambers of housing 228 may house lubricant 244, such as oil. The lubricant 244 may reduce friction and mitigate thermal energy from the first and second gears 234, 236 and other moving parts of the reduction component.

An axle housing 246 may enclose the components of the axle 210 such as a first shaft 250a, and a second shaft 250b. The axle housing 246 and a pinion housing 248 may enclose the differential 242. The pinion housing 248 and flange 230 may enclose the output 240. The first shaft 250a may drivingly couple the first hub 208a to the differential 242. The second shaft 250b may drivingly couple the second hub 208b to the differential 242. The first and second shafts 250a, 250b may be centered and spin about the second axis 203.

The differential 242 may distribute approximately the same torque to spin the first shaft 250a and the second shaft 250b. The differential 242 may distribute different torques to spin the first shaft 250a and the second shaft 250b spin. The first shaft 250a may deliver torque to rotate the first hub 208a. The second shaft 250b may deliver torque rotate the second hub 208b.

The first hub 208a may be formed of a first reduction set 252a enclosed by a first housing 254a. The second hub 208b may be formed of a second reduction set 252b enclosed by a second housing 254b. The first reduction set 252a and second reduction set 252b are wheel side reductions sets and may increase the torque to the first and second hubs 208a, 208b, respectively.

The first reduction set 252a may be a formed from a first sun gear 256a, a plurality of first planetary gears 258a, and a first ring gear 260a drivingly coupled to one another. The first ring gear 260a may be drivingly coupled to the first housing 254a. The second reduction set 252b may be a formed from a second sun gear 256b, a plurality of second planetary gears 258b, and a second ring gear 260b drivingly coupled to one another. The second ring gear 260b may be drivingly coupled the second housing 254b. The components of the first reduction set 252a and components of the second reduction set 252b may share the same dimensions.

The first sun gear 256a may spin with the first shaft 250a about the second axis 203. As the first sun gear 256a spins, the first sun gear 256a may force the first planetary gears 258a to rotate about the second axis 203. The rotation of the first planetary gears 258a may force the first ring gear 260a and first housing 254a to spin about the second axis 203. The transfer of rotational energy between the first sun gear 256a and first planetary gears 258a, and the first planetary gears 258a and the first ring gear 260a, may increase the torque and decrease the speed of rotation of the first housing 254a relative to the first shaft 250a.

Likewise, the second sun gear 256b may spin with the second shaft 250b about the second axis 203. As the second sun gear 256b spins, the second sun gear 256b may force the second planetary gears 258b to rotate about the second axis 203. The rotation of the second planetary gears 258b may force the second ring gear 260b and second housing 254b to spin about the second axis 203. The transfer of rotational energy between the second sun gear 256b and second planetary gears 258b, and the second planetary gears 258b and the second ring gear 260b, may increase the torque and decrease the speed of rotation of the second housing 254b relative to the second shaft 250b.

The differential 242 may be formed of a ring gear 262, a first side gear 264a, and a second side gear 264b. The output 240 may incorporate a pinion 261. The pinion 261 may have a plurality of teeth that may mesh with the teeth of the ring gear 262 and may drivingly couple the output 240 to the differential 242. The first side gear 264a and the second side gear 264b may be coupled to the first shaft 250a and second shaft 250b, respectively. The ring gear 262 may be drivingly coupled to first shaft 250a and second shaft 250b via the first side gear 264a and the second side gear 264b, respectively. The ring gear 262 may be drivingly coupled to the first side gear 264a and second side gear 264b via a pair of differential pinions.

The first shaft 220 may be supported by a first bearing 266. The second shaft 238 may be supported by a second bearing 268. The output 232 may be supported by third bearing 270. The first shaft 250a and second shaft 250b may be supported by a fourth bearing 272a and a fifth bearing 272b, respectively. Each of the first planetary gears 258a may be supported by a sixth bearing 274a. Each of the second planetary gears 258b may be supported by a seventh bearing 274b.

A plurality of first fasteners 282a may fasten the first hub 208a to a wheel. A plurality of second fasteners 282b may fasten the second hub 208b to a wheel. The first fasteners 282a and second fasteners 282b may have the same dimensions.

In an example, an additional motor and/or engine may be coupled to shaft 220 from below in FIG. 2.

Thus, disclosed herein is an assembly that may incorporate a brake component and a reduction component. The assembly may be drivingly coupled to an axle and a driveline of a vehicle. The assembly may be external to the components of the driveline and axle. The assembly may electrify the driveline and axle, incorporating an electric machine. The electric machine may drivingly couple to a driveline and differential via the component of the assembly. The reduction component may incorporate a plurality of gears or other reducers to reduce the rotational speed of the output of the electric machine. The brake component may incorporate a brake coupled to a shaft, wherein the brake may act as a park brake. The shaft may be coupled to the output of the reduction component and may be positioned parallel with respect to the electric machine and the output of the electric machine. The output of the reduction component may rotate at a lower speed than the motor. A brake may be used to stop or prevent the rotation of the shaft. Additionally, the brake may be activated via a single or plurality of mechanically or hydraulically actuated calipers, or a single or plurality of spring applied hydraulic released brake (SAHR) calipers.

Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and subcombinations of the various systems and configurations, and other features, functions, and/or properties disclosed herein.

As used herein, the term "approximately" is construed to mean plus or minus five percent of the range unless otherwise specified. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure. The disclosure also provides support for an electrified drivetrain, comprising: a motor, a speed reduction gearbox driven by the motor, and a parking brake coupled to a low-speed portion of the speed reduction gearbox through a shaft that is parallel to a rotor of the motor. In a first example of the system, the system further comprises: an axle differential coupled to the speed reduction gearbox through an output shaft, where the motor and the parking brake extends longitudinally from a first side of the speed reduction gearbox, and the output shaft extends longitudinally from a second, opposite, side of the speed reduction gearbox. In a second example of the system, optionally including the first example, the output shaft is aligned with a centerline of the vehicle. In a third example of the system, optionally including one or both of the first and second examples, an axis of the output shaft is parallel with a central longitudinal axis of the vehicle. In a fourth example of the system, optionally including one or more or each of the first through third examples, the parking brake is positioned laterally offset from the output shaft on an opposite side from the motor. In a fifth example of the system, optionally including one or more or each of the first through fourth examples, the parking brake is couplable and decouplable to the output shaft to provide parking brake operation. The disclosure also provides support for an electrified drivetrain of a vehicle, comprising: a motor rotating about a motor axis, the motor axis parallel with a longitudinal axis of the vehicle, a longitudinally positioned driveshaft engaging a differential input, a parking brake laterally offset on an opposite side of the longitudinally positioned driveshaft from the motor, and a speed reduction gearbox, the speed reduction gearbox positioned longitudinally between the parking brake and motor on one side, and the differential on the other side. In a first example of the system, the speed reduction gearbox includes a plurality of gears, with a speed reduction gearbox input coupled with the motor and a speed reduction gearbox output coupled with the longitudinally positioned driveshaft. In a second example of the system, optionally including the first example, the parking brake is configured to couple and uncouple from the longitudinally positioned driveshaft. In a third example of the system, optionally including one or both of the first and second examples, the longitudinally positioned driveshaft comprises a plurality of shafts coupled together to rotate as a single shaft. In a fourth example of the system, optionally including one or more or each of the first through third examples, parking brake couples and uncouples via calipers. In a fifth example of the system, optionally including one or more or each of the first through fourth examples, the parking brake is fixed to a housing of the speed reduction gearbox. In a sixth example of the system, optionally including one or more or each of the first through fifth examples, the parking brake is configured to only couple and uncouple from the longitudinally positioned driveshaft. In a seventh example of the system, optionally including one or more or each of the first through sixth examples, the parking brake includes a brake motor to couple and uncouple from the longitudinally positioned driveshaft. In an eighth example of the system, optionally including one or more or each of the first through seventh examples, a housing of the speed reduction gearbox spans laterally across the longitudinally positioned driveshaft. The disclosure also provides support for a method of operating an electrified drivetrain of a vehicle, comprising: operating a motor of a parking brake in a first direction to engage the parking brake with the electrified drivetrain and a second direction to disengage the parking brake from the electrified drivetrain, the electrified drivetrain including a traction motor rotating about a motor axis, the motor axis parallel with a longitudinal axis of the vehicle, a longitudinally positioned driveshaft engaging a differential input, where the parking brake is laterally offset on an opposite side of the longitudinally positioned driveshaft from the traction motor, the electrified drivetrain further including a speed reduction gearbox, the speed reduction gearbox positioned longitudinally between the parking brake and traction motor on one side, and the differential on the other side. In a first example of the method, the speed reduction gearbox includes a plurality of gears, with a speed reduction gearbox input coupled with the traction motor and a speed reduction gearbox output coupled with the longitudinally positioned driveshaft, the method including driving the vehicle via operation of the traction motor, wherein the motor axis of the traction motor is parallel with a rotational axis of the motor of the parking brake. In a second example of the method, optionally including the first example, the longitudinally positioned driveshaft comprises a plurality of shafts coupled together to rotate as a single shaft. In a third example of the method, optionally including one or both of the first and second examples, parking brake couples and uncouples via calipers. In a fourth example of the method, optionally including one or more or each of the first through third examples, the parking brake is fixed to a housing of the speed reduction gearbox.

The invention claimed is:

1. An electrified drivetrain, comprising:
   a motor;
   a speed reduction gearbox driven by the motor; and
   a parking brake coupled to a low-speed portion of the speed reduction gearbox through a shaft that is parallel to a rotor of the motor;
   wherein the shaft extends along a lateral side of the motor;
   wherein the parking brake includes a disk that partially extends across a longitudinal side of the motor; and
   wherein the speed reduction gearbox is positioned on a second longitudinal side of the motor.

2. The electrified drivetrain of claim 1, further comprising:
   an axle differential coupled to the speed reduction gearbox through an output shaft, where the motor and the parking brake extends longitudinally from a first side of the speed reduction gearbox, and the output shaft extends longitudinally from a second, opposite, side of the speed reduction gearbox.

3. The electrified drivetrain of claim 2, wherein the output shaft is aligned with a centerline of the vehicle.

4. The electrified drivetrain of claim 2, wherein an axis of the output shaft is parallel with a central longitudinal axis of a vehicle.

5. The electrified drivetrain of claim 2, wherein the parking brake is positioned laterally offset from the output shaft on an opposite side from the motor.

6. The electrified drivetrain of claim 5, wherein the parking brake is couplable and decouplable to the output shaft to provide parking brake operation.

7. An electrified drivetrain of a vehicle, comprising:
- a motor rotating about a motor axis, the motor axis parallel with a longitudinal axis of the vehicle;
- a longitudinally positioned driveshaft engaging an input of a differential;
- a parking brake laterally offset on an opposite side of the longitudinally positioned driveshaft from the motor; and
- a speed reduction gearbox, the speed reduction gearbox positioned longitudinally between the parking brake and motor on one side, and the differential on the other side;
- wherein the longitudinally positioned driveshaft extends along a lateral side of the motor;
- wherein the parking brake includes a disk that partially extends across a longitudinal side of the motor; and
- wherein the speed reduction gearbox is positioned on a second longitudinal side of the motor.

8. The electrified drivetrain of claim 7, wherein the speed reduction gearbox includes a plurality of gears, with a speed reduction gearbox input coupled with the motor and a speed reduction gearbox output coupled with the longitudinally positioned driveshaft.

9. The electrified drivetrain of claim 8, wherein the parking brake is configured to couple and uncouple from the longitudinally positioned driveshaft.

10. The electrified drivetrain of claim 9, wherein the longitudinally positioned driveshaft comprises a plurality of shafts coupled together to rotate as a single shaft.

11. The electrified drivetrain of claim 9, wherein the parking brake couples and uncouples via calipers.

12. The electrified drivetrain of claim 9, wherein the parking brake is fixed to a housing of the speed reduction gearbox.

13. The electrified drivetrain of claim 9, wherein the parking brake is configured to only couple and uncouple from the longitudinally positioned driveshaft.

14. The electrified drivetrain of claim 7, wherein the parking brake includes a brake motor to couple and uncouple from the longitudinally positioned driveshaft.

15. The electrified drivetrain of claim 7, wherein a housing of the speed reduction gearbox spans laterally across the longitudinally positioned driveshaft.

16. A method of operating an electrified drivetrain of a vehicle, comprising:
- operating a motor of a parking brake in a first direction to engage the parking brake with the electrified drivetrain and a second direction to disengage the parking brake from the electrified drivetrain, the electrified drivetrain including a traction motor rotating about a motor axis, the motor axis parallel with a longitudinal axis of the vehicle, a longitudinally positioned driveshaft engaging an input of a differential, where the parking brake is laterally offset on an opposite side of the longitudinally positioned driveshaft from the traction motor, the electrified drivetrain further including a speed reduction gearbox, the speed reduction gearbox positioned longitudinally between the parking brake and traction motor on one side, and the differential on the other side;
- wherein the longitudinally positioned driveshaft extends along a lateral side of the motor;
- wherein the parking brake includes a disk that partially extends across a longitudinal side of the motor; and
- wherein the speed reduction gearbox is positioned on a second longitudinal side of the motor.

17. The method of claim 16, wherein the speed reduction gearbox includes a plurality of gears, with a speed reduction gearbox input coupled with the traction motor and a speed reduction gearbox output coupled with the longitudinally positioned driveshaft, the method including driving the vehicle via operation of the traction motor, wherein the motor axis of the traction motor is parallel with a rotational axis of the motor of the parking brake.

18. The method of claim 17, wherein the longitudinally positioned driveshaft comprises a plurality of shafts coupled together to rotate as a single shaft.

19. The method of claim 18, wherein the parking brake couples and uncouples via calipers.

20. The method of claim 19, wherein the parking brake is fixed to a housing of the speed reduction gearbox.

* * * * *